(12) United States Patent
Lee et al.

(10) Patent No.: US 7,778,217 B2
(45) Date of Patent: Aug. 17, 2010

(54) SYSTEM AND METHOD FOR SCHEDULING UPLINK IN A COMMUNICATION SYSTEM

(75) Inventors: Young-Soon Lee, Yongin-si (KR); Byung-Chan Ahn, Seoul (KR); Il-Jin Youn, Bucheon-si (KR); Jang-Won Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1002 days.

(21) Appl. No.: 11/489,192

(22) Filed: Jul. 19, 2006

(65) Prior Publication Data

US 2007/0019668 A1    Jan. 25, 2007

(30) Foreign Application Priority Data

Jul. 19, 2005    (KR) ...................... 10-2005-0065525

(51) Int. Cl.
*H04W 4/00* (2009.01)
(52) U.S. Cl. .................. 370/328; 370/329; 370/318; 370/341; 455/450
(58) Field of Classification Search .............. 455/403, 455/450–453, 509, 69, 522; 370/328–345, 370/395.52, 318, 310, 395.21
See application file for complete search history.

(56) References Cited

U.S. PATENT DOCUMENTS

| | | | |
|---|---|---|---|
| 7,142,548 B2 * | 11/2006 | Fong et al. ............... | 370/395.4 |
| 2004/0109424 A1 * | 6/2004 | Chheda ...................... | 370/331 |
| 2005/0047393 A1 * | 3/2005 | Liu ............................. | 370/352 |
| 2005/0169301 A1 * | 8/2005 | Jain et al. .................... | 370/464 |
| 2005/0250511 A1 * | 11/2005 | Xiao et al. ................... | 455/453 |
| 2006/0002414 A1 * | 1/2006 | Du et al. ..................... | 370/413 |
| 2006/0176866 A1 * | 8/2006 | Wakabayashi .............. | 370/342 |
| 2007/0076679 A1 * | 4/2007 | Lee ............................. | 370/348 |
| 2007/0099647 A1 * | 5/2007 | Lee et al. .................... | 455/522 |

FOREIGN PATENT DOCUMENTS

| | | |
|---|---|---|
| CN | 1423495 | 6/2003 |
| CN | 1521956 | 8/2004 |
| KR | 1020050097726 | 10/2005 |
| WO | WO 2005/039229 | 4/2005 |

* cited by examiner

*Primary Examiner*—Kamran Afshar
(74) *Attorney, Agent, or Firm*—The Farrell Law Firm, LLP

(57) ABSTRACT

An uplink scheduling system and method in a wireless broadband internet communication system includes calculating priorities of mobile stations (MSs) taking into account headroom size indicating transmission power additionally available for each of the MSs; and determining a transmission format of an MS selected to be preferentially allocated a slot as a result of the priority calculation, taking into account headroom size reported by the selected MS and a margin determined depending on a variation in channel state between the selected MS and a base station (BS).

17 Claims, 5 Drawing Sheets

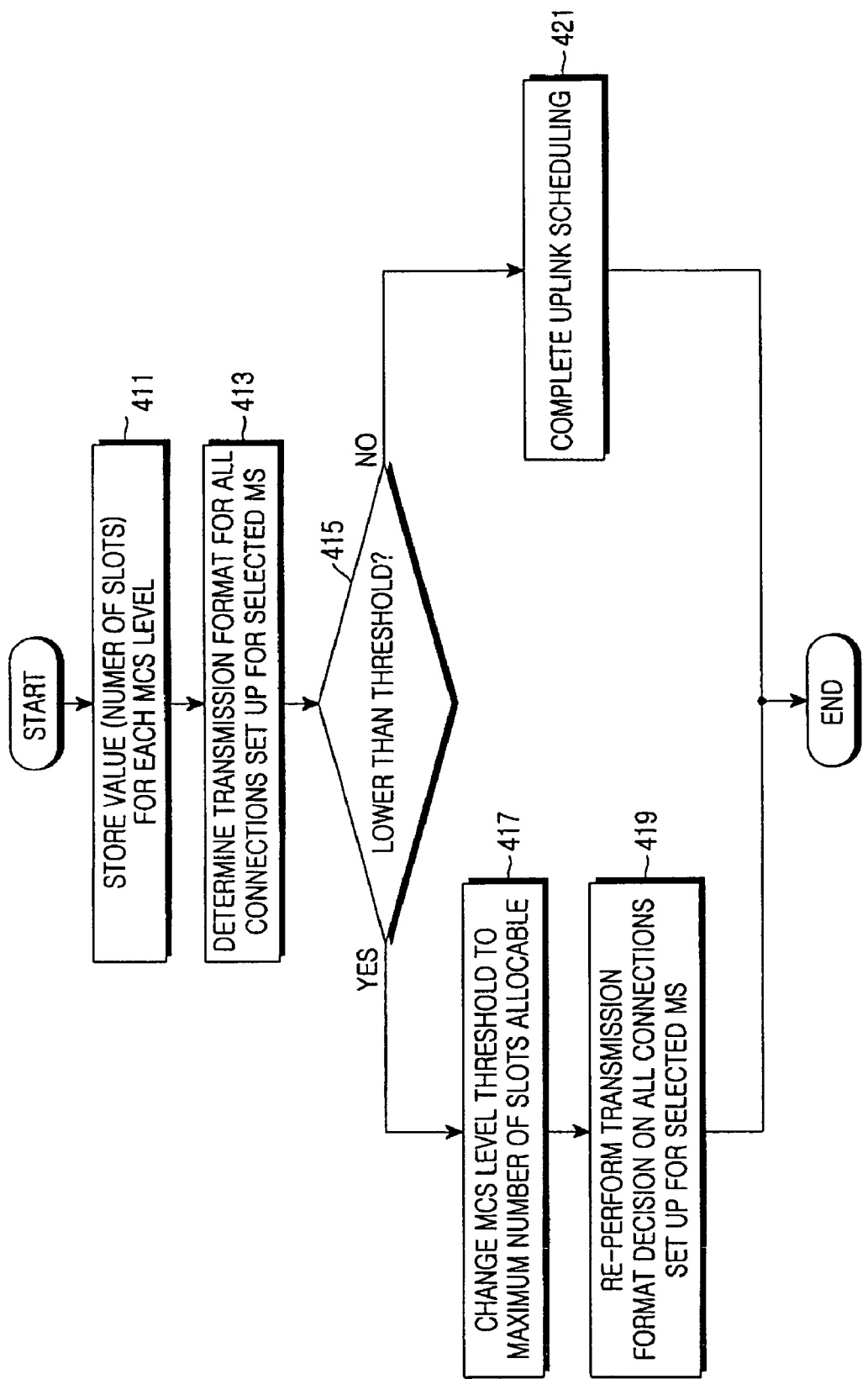

SYSTEM AND METHOD FOR SCHEDULING UPLINK IN A COMMUNICATION SYSTEM

PRIORITY

This application claims the benefit under 35 U.S.C. §119(a) of an application entitled "System and Method for Scheduling Uplink in a Communication System" filed in the Korean Intellectual Property Office on Jul. 19, 2005 and assigned Serial No. 2005-65525, the contents of which are incorporated herein by reference.

BACKGROUND OF THE INVENTION

1. Field of the Invention

The present invention relates generally to a scheduling system and method in a communication system, and in particular, to a system and method for performing uplink scheduling in a communication system.

2. Description of the Related Art

Generally, the next generation communication system is evolving into an advanced system for providing high-speed, high-capacity data transmission/reception services to subscriber stations (SSs). A wireless broadband Internet communication system based on the Institute of Electrical and Electronics Engineers (IEEE) 802.16e standard is a typical example of the next generation communication system. In the wireless broadband Internet communication system, data transmission is performed on a frame by frame basis, and each frame is divided into a region for transmitting downlink data and a region for transmission uplink data. The region for transmitting the uplink data is formed in a 2-dimensional arrangement of (frequency domain×time domain), and each element of the 2-dimensional arrangement becomes a slot, which is an uplink resource allocation unit. That is, the frequency domain is divided in units of subchannels, each of which is a bundle of subcarriers, and the time domain is divided in units of a plurality of symbols, for example three symbols. Therefore, the slot represents a region where three symbols are occupied by one subchannel.

In addition, each slot is allocated to only one particular mobile station (MS) among the MSs located in one cell, and a set of slots allocated to the MSs located in the one cell becomes a burst. In this way, the wireless broadband Internet communication system allocates the uplink resources in such a manner that each MS uses the slots on a sharing basis.

In the uplink of the existing communication system such as a Code Division Multiple Access (CDMA) 2000 communication system and a Wideband Code Division Multiple Access (WCDMA) communication system, a signal transmitted from one particular MS serves as an interference component to another MS. Therefore, the existing communication system performs power control such that the signals transmitted by all MSs are received at a base station (BS) at almost the same received power regardless of channel states between the MSs and the BS.

In this case, however, the MS having a good channel state with the BS cannot use its full transmission power resources, causing inefficiency. In addition, the existing communication system enables a plurality of BSs to receive the signal transmitted by one MS, using soft handover or softer handover. As a result, it indicates that uplink scheduling should be achieved in a BS's upper layer rather than the BS. Therefore, in the uplink of the existing communication system, uplink scheduling is mainly performed on a circuit basis, using a data rate control scheme that increases or decreases a data rate of each of the MSs according to loading.

The uplink of the wireless broadband Internet communication system is different in characteristics from the uplink of the existing communication system. The differences in the characteristics are as follows.

First, the wireless broadband Internet communication system has a characteristic that when a BS receives a signal transmitted by a particular MS, the signals transmitted by other MSs in the same cell do not serve as interference to the received signal. This is because all MSs in the same cell perform a ranging operation to acquire synchronization so that the signals transmitted by different MSs should be simultaneously received at the BS, and use a Cyclic Prefix or Cyclic Postfix so that the signals received at the BS through multiple paths at different times do not serve as interference to each other.

In addition, due to the characteristic of Orthogonal Frequency Division Multiple Access (OFDMA) used by the wireless broadband Internet communication system, the subcarries used in the wireless broadband Internet communication system are orthogonal to each other. Therefore, in the wireless broadband Internet communication system, the signal transmitted by an MS through a particular slot does not affect the signals transmitted through other slots. This is equivalent in effect to allowing the downlink of the existing communication system to use different orthogonal codes so as to prevent the signals targeting MSs from serving as interference to each other.

Second, the uplink of the wireless broadband Internet communication system has a characteristic that it uses hard handover due to the characteristic of the diversity subchannel allocation scheme, neighbor BSs or neighbor sectors use different subcarrier permutations. The diversity subchannel allocation scheme, a scheme for mixing and grouping a plurality of subcarriers included in the full frequency band used in the wireless broadband Internet communication system in a different way for every BS (or sector), generates a plurality of diversity subchannels and allocates the generated diversity subchannels to a corresponding MS.

Due to the uplink characteristics of the wireless broadband Internet communication system, there is a need for a new uplink scheduling scheme different from the uplink scheduling scheme of the existing communication system.

SUMMARY OF THE INVENTION

It is, therefore, an aspect of the present invention to provide an uplink scheduling system and method in a wireless broadband Internet communication system.

According to one aspect of the present invention, there is provided an uplink scheduling system in a wireless broadband internet communication system. The uplink scheduling system includes an uplink scheduler for calculating priorities of mobile stations (MSs) taking into account headroom size indicating transmission power additionally available for each of the MSs, and determining a transmission format of an MS selected to be preferentially allocated a slot as a result of the priority calculation, taking into account headroom size reported by the selected MS and a margin determined based on a variation in a channel state between the selected MS and a base station (BS).

According to another aspect of the present invention, there is provided an uplink scheduling method in a wireless broadband internet communication system. The method includes calculating priorities of mobile stations (MSs) taking into account headroom size indicating transmission power additionally available for each of the MSs; and determining a transmission format of an MS selected to be preferentially allocated a slot as a result of the priority calculation, taking into account headroom size reported by the selected MS and a margin determined based on a variation in a channel state between the selected MS and a base station (BS).

BRIEF DESCRIPTION OF THE DRAWINGS

The above and other objects, features and advantages of the present invention will become more apparent from the following detailed description when taken in conjunction with the accompanying drawings in which:

FIG. 4 is a flowchart illustrating an operation in which the uplink scheduler of FIG. 1 increases slot utilization.

DETAILED DESCRIPTION OF PREFERRED EMBODIMENTS

Figure 1:
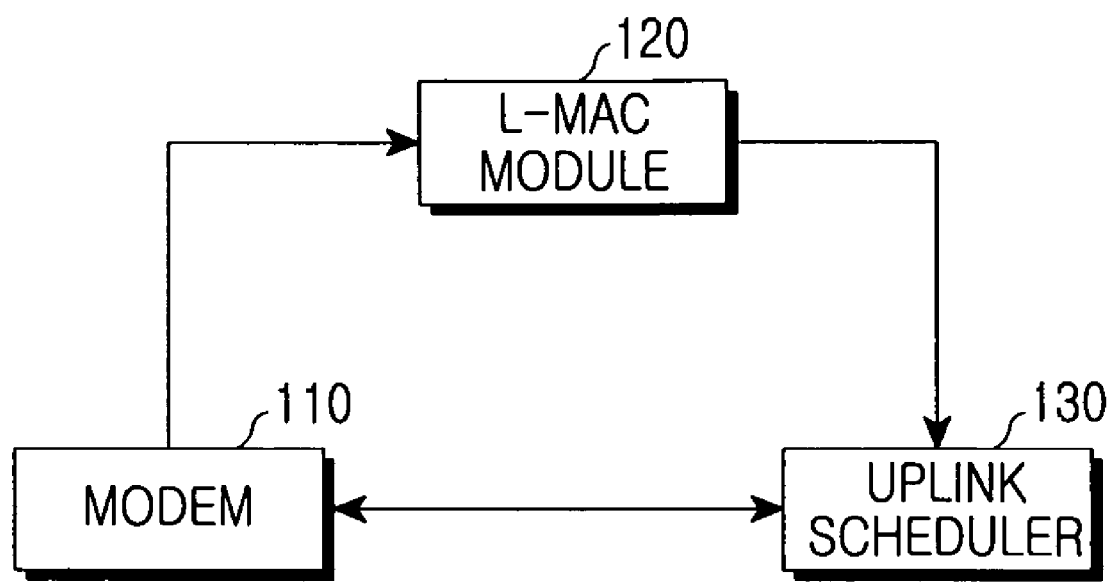
FIG. 1 is a diagram illustrating a structure of an uplink scheduling system in a wireless broadband Internet communication system according to the present invention.

Several preferred embodiments of the present invention will now be described in detail with reference to the annexed drawings. In the following description, a detailed description of known functions and configurations incorporated herein has been omitted for clarity and conciseness.

The present invention provides an uplink scheduling system and method in a communication system, for example, a wireless broadband Internet communication system based on the Institute of Electrical and Electronics Engineers (IEEE) 802.16e standard. Although a description of the present invention will be made herein with reference to the wireless broadband Internet communication system, the uplink scheduling system and method of the present invention can also be applied to other communication systems as well as the wireless broadband Internet communication system.

The uplink scheduling scheme for the wireless broadband Internet communication system, of the present invention, is implemented so as to achieve the following three design goals.

A first design goal is to allow all base stations (BSs) to have an appropriate load level through loading control so as to guarantee the coverage satisfying a reference data rate.

A second design goal is to detect a variation in channel state between each mobile station (MS) and a BS, thereby to maximize efficiency of wireless resources while guaranteeing fairness.

A third design goal is to obtain the optimal scheduling result within a predetermined time limit.

A detailed description will now be made of each of the above three design goals.

The first design goal is to design an interference control scheme for the case where there is no intra-cell interference, and then allow all MSs located not only in the cell center but also in the cell boundary to be provided with a guarantee for a reference data rate, using the interference control scheme.

Generally, not only the uplink of the wireless broadband Internet communication system, but also the uplink of the existing communication system such as a Code Division Multiple Access (CDMA) 2000 communication system and a Wideband Code Division Multiple Access (WCDMA) communication system uses a control scheme for maintaining Rise over Thermal (RoT) at a predetermined RoT threshold, or maintaining a load at a predetermined load threshold.

While most uplink interferences in the existing communication system include intra-cell interference components, most interferences in the wireless broadband Internet communication system include inter-cell interference components. The reason why most interferences in the wireless broadband Internet communication system include inter-cell interference components is because the wireless broadband Internet communication system has a characteristic that when a BS receives a signal transmitted by a particular MS, the signals transmitted by other MSs in the same cell do not serve as interference to the received signal, so there is no intra-cell interference. While the intra-cell interference can be simply and directly controlled by controlling a data rate of the MSs located in the cell, the inter-cell interference needs to be indirectly controlled since it does not lend itself to being directly controlled.

The second design goal is to detect a variation in channel state between each MS and a BS, and maximize the efficiency of wireless resources while guaranteeing fairness, using a priority calculation scheme.

Generally, in the downlink of the existing communication system or the wireless broadband Internet communication system, an MS receives a reference signal, for example, a pilot signal or a preamble signal, periodically transmitted from a BS, and the MS measures a level of the received reference signal and reports the measured reference signal level to the BS. Then the BS can detect a variation in a channel state between the BS and the MS depending on the reference signal level reported by the MS.

However, in the uplink of the wireless broadband Internet communication system, because there is no reference signal that a BS receives from an MS to detect a variation in a channel state between the BS and the MS, the BS cannot detect the variation in the channel state between the BS and the MS. The current IEEE 802.16e standard proposes that each MS can report its current transmission power level to a BS, or that each MS can report an additionally available transmission power (headroom) level.

The present invention allows a BS to detect a variation in a channel state between the BS and each MS using the transmission power level or the headroom reported by each MS. In addition, the BS uses the transmission power level or the headroom reported by each MS to make transmission format decisions and priority calculations. The "transmission format" as used herein refers to a Modulation and Coding Scheme (MCS) level and the number of allocation slots.

A description will now be made of an operation in which the BS calculates priorities.

The BS calculates a priority by converting the headroom reported from an MS into a value for a predetermined reference state and dividing the converted value by an average data rate for each individual MS. Therefore, the priority is calculated such that as the MS has a better channel state, the MS has a higher average data rate, and is also calculated such that even though the channel state of the MS is poor, the MS can be allocated some slots, guaranteeing a manual level of for fairness.

The BS separately constructs a Quality of Service (QoS) scheduling layer for the MS that desires to transmit the data having a QoS class in which there are bandwidth and delay restriction requests. Herein, the QoS classes in which there are bandwidth and delay restriction requests include an Unsolicited Grant Service (UGS) class, a real time Polling Service (rtPS) class, and an extended real time Polling Service (ertPS)

class. That is, in the wireless broadband Internet communication system, the BS performs scheduling according to scheduling type. The scheduling type is divided into QoS scheduling type and non-QoS scheduling type. When the BS performs scheduling according to QoS scheduling type, the BS generates scheduling layer according to each of an UGS class, a rtPS class, and an ertPS class. However, the present invention provides an uplink scheduling system and method according to non-QoS scheduling type. So, a method of constructing the separate QoS scheduling layer is not directly related to the present invention, so a detailed description thereof will be omitted herein. In addition, even when calculating the priorities, the BS can take into account the minimum bandwidth and delay restriction requests in addition to the headroom and the average data rate.

The third design goal is to obtain the optimal scheduling result within a predetermined time limit.

Each frame of the wireless broadband Internet communication system is divided into a region for transmitting downlink data and a region for transmission uplink data. The region for transmitting the uplink data is formed in a 2-dimensional arrangement of (frequency domain×time domain), and each element of the 2-dimensional arrangement becomes a slot, which is an uplink resource allocation unit. That is, the frequency domain is divided in units of subchannels, each of which is a bundle of subcarriers, and the time domain is divided in units of a plurality of symbols, for example three symbols. Therefore, the slot represents a region where three symbols are occupied by one subchannel. Each slot is allocated to only one particular MS among the MSs located in one cell, and a set of slots allocated to the MSs located in the one cell becomes a burst. In this way, the wireless broadband Internet communication system allocates the uplink resources in such a manner that each MS uses the slots on a sharing basis.

In the frame structure of the wireless broadband Internet communication system, each slot can be allocated to different MSs. In addition, each MS can be controlled such that each MS is allocated a large number of slots and uses a low MCS level. On contrary, each MS can be controlled such that each MS is allocated a small number of slots and uses a high MCS level. There are an infinite number of schemes for allocating uplink slots of the wireless broadband Internet communication system to MSs and determining a transmission format of each burst. The uplink scheduling scheme of the wireless broadband Internet communication system, of the present invention, which is a relatively simple scheme, allocates uplink slots to MSs and determines a transmission format of each burst, thereby obtaining the optimal scheduling results within a predetermined time limit.

FIG. 1 is a diagram illustrating a structure of an uplink scheduling system in a wireless broadband Internet communication system according to the present invention.

Referring to FIG. 1, the uplink scheduling system includes a modem 110, a Low-Medium Access Control (L-MAC) module 120, and an uplink scheduler 130. The uplink scheduler 130 can be implemented in, for example, a digital signal processor (DSP) in a channel card of a BS.

The modem 110 generates a received burst by demodulating and decoding signals received from MSs, and outputs the received burst to the L-MAC module 120. The modem 110 calculates a size of the received burst, for example, calculates an estimated Carrier to Interference and Noise Ratio (CINR) value and a load level, and outputs the CINR value and the load level to the uplink scheduler 130. The load level includes the total RoT indicating a load for the full received signal level, and an effective RoT indicating a load for an actual interference signal level.

The L-MAC module 120 receives the received burst output from the modem 110, detects a Connection Identifier (CID) of a corresponding MS, a transmission power level or headroom of the corresponding MS, and the amount of a bandwidth required by the corresponding MS, included in a MAC header, and outputs the detected information to the uplink scheduler 130.

The uplink scheduler 130 performs uplink scheduling using the estimated CINR value and the load level output from the modem 110, and the CID of the corresponding MS, the transmission power level or headroom of the corresponding MS, and the amount of the bandwidth required by the corresponding MS, output from the L-MAC module 120. An uplink scheduling operation performed by the uplink scheduler 130 will be described in detail hereinbelow. The uplink scheduler 130, as it performs the uplink scheduling, outputs slot allocation information for the corresponding MS and MCS level information for each individual burst, to the modem 110. The modem 110 encodes the slot allocation information for the corresponding MS and the MCS level information for each individual burst, received from the uplink scheduler 130, using a predetermined coding scheme, modulates the encoded signal using a predetermined modulation scheme, and transmits the modulated signal to the corresponding MS.

A description will now be made of an uplink scheduling operation performed by the uplink scheduler 130.

The uplink scheduling operation performed by the uplink scheduler 130 can be roughly divided into a loading control operation, a priority calculation operation, and a transmission format decision operation. The loading control operation, the priority calculation operation, and the transmission format decision operation will be described in detail hereinbelow.

First, the loading control operation is a control operation for maintaining interference between a BS and its neighbor BSs, i.e. inter-cell interference, at a predetermined inter-cell interference threshold.

As described above, because there is no intra-cell interference in the uplink of the wireless broadband Internet communication system, it is difficult to control the inter-cell interference at an inter-cell interference threshold level set between neighbor BSs, compared with the exiting communication system. The maximum MCS level that can be used by each MS for burst transmission is determined according to the results of the loading control operation.

The uplink scheduler 130 performs hierarchical uplink scheduling according to a characteristic of the information data to be transmitted by the MS. The characteristic of the information data is determined according to whether the information data is control data or user data, or whether its QoS class is high or low.

The uplink scheduler 130 preferentially allocates slots using a First Input First Output (FIFO) scheduling scheme, for the MS that will transmit a bandwidth request or control data. Thereafter, the uplink scheduler 130 allocates slots using a QoS scheduling scheme, for the MS that will transmit the data having a QoS class in which there is a delay restriction request, such as the UGS, rtPS and ertPS classes. Finally, the uplink scheduler 130 allocates slots using a General Fair (G-Fair) scheduling scheme, for the MS that will transmit the data having a QoS class in which there is a lower delay restriction request or there is no delay restriction request, such as the non-real time Polling Service (nrtPS) service and the Best Effort (BE) service.

Second, the priority calculation operation is an operation of calculating a priority to select the MS to which it will preferentially allocate slots, from among the MSs that transmit data having the same QoS class, when using the QoS scheduling scheme and the G-Fair scheduling scheme. The priority is calculated by assuming that headroom information is converted into the same transmission format, and then dividing the converted value by an average data rate of a corresponding MS. If there is a delay restriction or a data rate restriction, a separate weight is applied during the priority calculation.

Third, the transmission format decision operation is an operation of determining a transmission format of the data to be transmitted from the MS selected through the priority calculation operation to the BS.

Figure 2A:
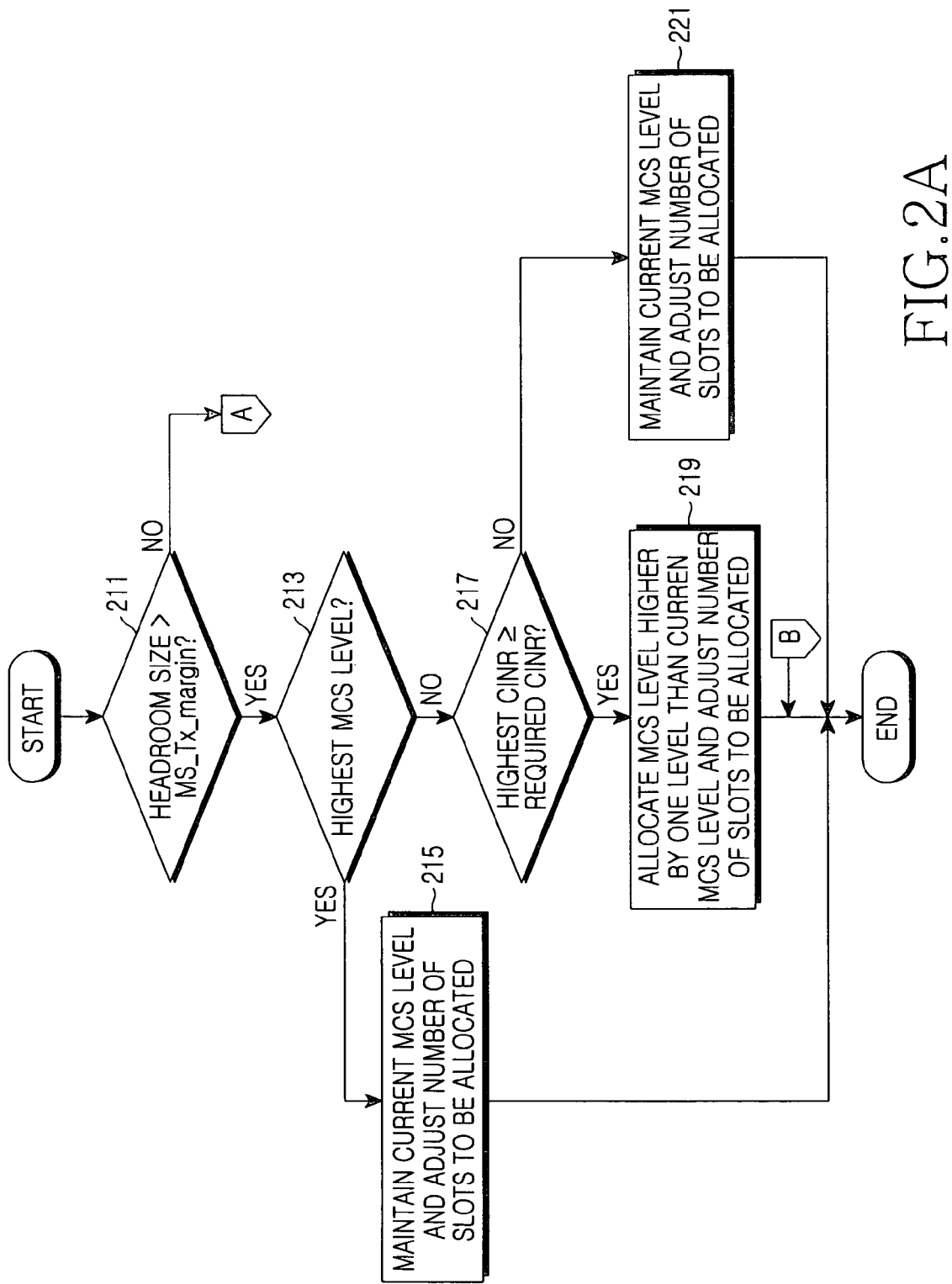
FIGS. 2A and 2B are flowcharts illustrating an operation in which the uplink scheduler of FIG. 1 determines a transmission format when one connection is set up for a selected MS.
Figure 2B:
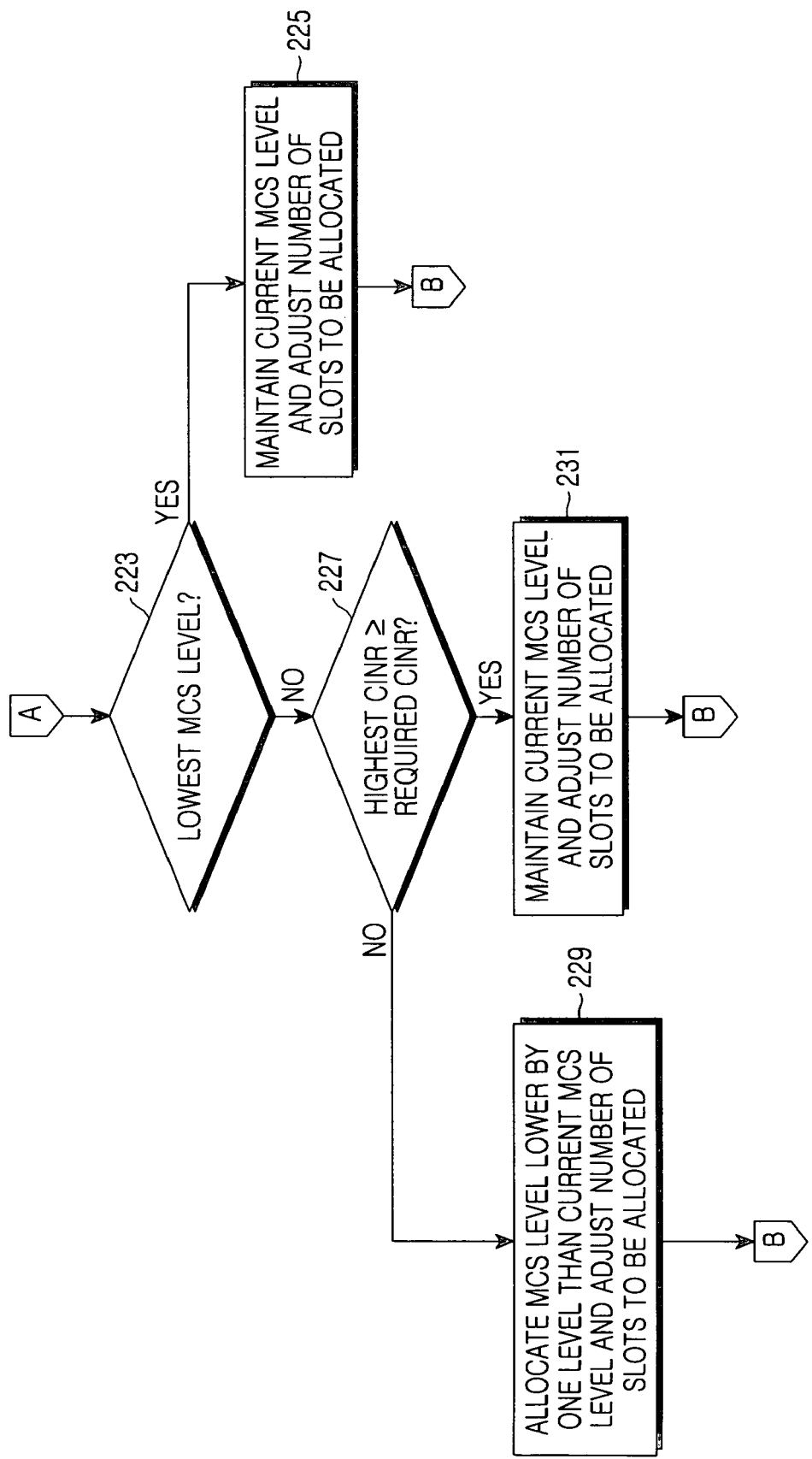

FIGS. 2A and 2B are flowcharts illustrating an operation in which the uplink scheduler 130 of FIG. 1 determines a transmission format when one connection is set up for a selected MS.

Before a description of FIGS. 2A and 2B is given, a brief description will be made of a transmission format decision operation of the uplink scheduler 130 performed when one connection is set up for the selected MS.

For an MS selected through priority calculation such that it should be preferentially allocated slots, the uplink scheduler 130 determines a transmission format at the next scheduling time taking into account the headroom size reported by the selected MS and a margin MS_Tx_margin determined based on a variation in a channel state between the selected MS and the BS. In addition, the uplink scheduler 130 determines a transmission format of the selected MS at the previous uplink scheduling time every time the uplink scheduler 130 performs uplink scheduling, and determines a transmission format of the selected MS at the current time taking an estimated CINR value of the selected MS into account at the previous uplink scheduling time.

That is, if the headroom reported by the selected MS exceeds the MS_Tx_margin, the uplink scheduler 130 increases a transmission format to be applied to the selected MS in MCS level, compared with the transmission format applied to the selected MS at the previous scheduling time, or increases the number of slots allocated to the selected MS, thereby increasing the data rate. On the contrary, if the headroom reported by the MS is lower than the MS_Tx_margin, the uplink scheduler 130 decreases a transmission format to be applied to the selected MS in MCS level, compared with the transmission format applied to the selected MS at the previous scheduling time, or decreases the number of slots to be allocated to the selected MS, thereby decreasing the data rate.

Referring to FIGS. 2A and 2B, the uplink scheduler 130 determines in step 211 whether headroom size reported by an MS selected through a priority calculation exceeds MS_Tx_margin. If it is determined that the headroom size reported by the selected MS exceeds MS_Tx_margin, the uplink scheduler 130 proceeds to step 213. Because the headroom size reported by the selected MS exceeding MS_Tx_margin indicates that the selected MS can support a higher data rate, the uplink scheduler 130 increases an MCS level currently used by the selected MS, or increases the number of slots to be allocated to the selected MS, thereby allowing the selected MS to support a higher data rate.

In step 213, the uplink scheduler 130 determines whether the MCS level currently used by the selected MS is the highest MCS level available in the wireless broadband Internet communication system. If it is determined that the MCS level currently used by the selected MS is the highest MCS level available in the wireless broadband Internet communication system, the uplink scheduler 130 proceeds to step 215. Because the MCS level currently used by the selected MS is the highest MCS level available in the wireless broadband Internet communication system, the uplink scheduler 130 can no longer increase the MCS level. Therefore, the uplink scheduler 130 increases the number of slots to be allocated to the selected MS, thereby allowing the selected MS to support a higher data rate.

In step 215, the uplink scheduler 130 adjusts the number of slots to be allocated to the selected MS, and then ends the operation. The uplink scheduler 130 increases the number of slots to be allocated to the selected MS, compared with the number of slots allocated to the selected MS at the previous scheduling time, and the number of slots to be allocated to the selected MS is determined in accordance with Equation (1):

$$N_{slot} = \frac{CINR_{candidate}}{CINR_{required}(MCS)} \times N_{slot,prev} \quad (1)$$

In Equation (1), $N_{slot}$ denotes the number of slots to be allocated to the selected MS at the current scheduling time, $N_{slot,prev}$ denotes the number of slots allocated to the selected MS at the previous scheduling time, $CINR_{candidate}$ denotes the highest possible CINR calculated using an estimated CINR value of the selected MS and headroom information at the previous scheduling time, i.e. the highest CINR that the selected MS can obtain at the previous scheduling time, and $CINR_{required}(MCS)$ denotes a CINR required to satisfy a target burst error rate at the determined MCS level.

If the number of slots determined in accordance with Equation (1) exceeds the required number of slots calculated taking into account the required amount of a bandwidth required by the selected MS, the uplink scheduler 130 finally determines the required number of slots calculated taking into account the required amount of a bandwidth required by the selected MS as the number of slots to be allocated to the selected MS, and then ends the operation.

In addition, even if the number of slots determined in accordance with Equation (1) exceeds the maximum number of slots that one MS can use, which is restricted for each individual MCS level in the wireless broadband Internet communication system, the uplink scheduler 130 finally determines the maximum number of slots that one MS can use, which is restricted for each individual MCS level, as the number of slots to be allocated to the selected MS. The reason for restricting the maximum number of slots that one MS can use for each individual MCS level in the wireless broadband Internet communication system will be described in detail hereinbelow.

If it is determined in step 213 that the MCS level currently used by the selected MS is not the highest MCS level available in the wireless broadband Internet communication system, the uplink scheduler 130 proceeds to step 217. Herein, because the MCS level currently used by the selected MS is not the highest MCS level available in the wireless broadband Internet communication system, the uplink scheduler 130 can further increase the MCS level. Therefore, the uplink scheduler 130 further increases the MCS level to be allocated to the selected MS, or increases the number of slots to be allocated to the selected MS, thereby allowing the selected MS to support a higher data rate.

In step 217, the uplink scheduler 130 determines whether the highest possible CINR exceeds a CINR required when it allocates an MCS level higher by a set level, for example, one level than the MCS level allocated to the selected MS at the previous scheduling time, i.e. the MCS level currently used by the selected MS. If it is determined that the highest possible CINR exceeds the CINR required when it allocates an MCS level higher by one level than the MCS level allocated to the selected MS at the previous scheduling time, the uplink scheduler 130 proceeds to step 219. In step 219, the uplink scheduler 130 allocates an MCS level higher by one level than the MCS level allocated to the selected MS at the previous scheduling time, and adjusts the number of slots to be allocated to the selected MS taking into account the headroom reported by the selected MS and the allocated MCS level, and then ends the operation. The uplink scheduler 130, as described in step 215, determines the number of slots to be allocated to the selected MS using Equation (1), and if the number of slots calculated in accordance with Equation (1) exceeds the required number of slots calculated taking into account the required amount of the bandwidth required by the selected MS, the uplink scheduler 130 finally determines the required number of slots calculated taking into account the required amount of the bandwidth required by the selected MS as the number of slots to be allocated to the selected MS. In addition, even if the number of slots calculated in accordance with Equation (1) exceeds the maximum number of slots that one MS can use, which is restricted for each individual MCS level in the wireless broadband Internet communication system, the uplink scheduler 130 finally determines the maximum number of slots that one MS can use, which is restricted for each individual MCS level, as the number of slots to be allocated to the selected MS, and then ends the operation.

However, if it is determined in step 217 that the highest possible CINR is lower than the CINR required when it allocates an MCS level higher by one level than the MCS level allocated to the selected MS at the previous scheduling time, the uplink scheduler 130 proceeds to step 221. In step 221, the uplink scheduler 130 maintains the MCS level allocated to the selected MS at the previous scheduling time, and determines, as described in step 215, the number of slots to be allocated to the selected MS using Equation (1). If the number of slots calculated using Equation (1) exceeds the required number of slots calculated taking into account the required bandwidth required by the selected MS, the uplink scheduler 130 finally determines the required number of slots calculated taking into account the required amount of the bandwidth required by the selected MS as the number of slots to be allocated to the selected MS. In addition, even if the number of slots calculated in accordance with Equation (1) exceeds the maximum number of slots that one MS can use, which is restricted for each individual MCS level in the wireless broadband Internet communication system, the uplink scheduler 130 finally determines the maximum number of slots that one MS can use, which is restricted for each individual MCS level, as the number of slots to be allocated to the selected MS, and then ends the operation.

If there is almost no variation in the channel state between the selected MS and the BS, i.e. if a variation in the channel state between the selected MS and the BS is small, the number of slots allocated to the selected MS may increase, with the MCS level allocated thereto remaining unchanged. This may cause an unnecessary waste of wireless resources when the MCS level allocated to the selected MS is low. Therefore, in order to prevent the unnecessary waste of the wireless resources, the uplink scheduler 130 restricts, in step 221, the maximum number of slots that one MS can use, for each individual MCS level in the wireless broadband Internet communication system. Thus, when the number of slots allocated to the selected MS increases, the uplink scheduler 130 should automatically increase the MCS level. In this case, the uplink scheduler 130 should adjust the number of slots taking into account a difference between the previously allocated MCS level and the increase MCS level.

However, if it is determined in step 211 that the headroom size reported by the selected MS is less than MS_Tx_margin, the uplink scheduler 130 proceeds to step 223. Because the size of the headroom reported by the selected MS being less than MS_Tx_margin indicates that the selected MS cannot support a higher data rate, the uplink scheduler 130 decreases an MCS level currently used by the selected MS, or decreases the number of slots to be allocated to the selected MS, thereby allowing the selected MS to support a lower data rate.

In step 223, the uplink scheduler 130 determines whether the MCS level currently used by the selected MS is the lowest MCS level available in the wireless broadband Internet communication system. If it is determined that the MCS level currently used by the selected MS is the lowest MCS level available in the wireless broadband Internet communication system, the uplink scheduler 130 proceeds to step 225. Herein, because the MCS level currently used by the selected MS is the lowest MCS level available in the wireless broadband Internet communication system, the uplink scheduler 130 can no longer decrease the MCS level. Therefore, the uplink scheduler 130 decreases the number of slots to be allocated to the selected MS, thereby allowing the selected MS to support a lower data rate.

In step 225, the uplink scheduler 130 adjusts the number of slots to be allocated to the selected MS, and then ends the operation. The uplink scheduler 130 decreases the number of slots to be allocated to the selected MS, compared with the number of slots allocated to the selected MS at the previous scheduling time, and the number of slots to be allocated to the selected MS is determined in accordance with Equation (1). If the number of slots calculated in accordance with Equation (1) exceeds the required number of slots calculated taking into account the required amount of a bandwidth required by the selected MS, the uplink scheduler 130 finally determines the required number of slots calculated taking into account the required amount of a bandwidth required by the selected MS as the number of slots to be allocated to the selected MS. In addition, even if the number of slots calculated in accordance with Equation (1) exceeds the maximum number of slots that one MS can use, which is restricted for each individual MCS level in the wireless broadband Internet communication system, the uplink scheduler 130 finally determines the maximum number of slots that one MS can use, which is restricted for each individual MCS level, as the number of slots to be allocated to the selected MS.

If it is determined in step 223 that the MCS level currently used by the selected MS is not the lowest MCS level available in the wireless broadband Internet communication system, the uplink scheduler 130 proceeds to step 227. Herein, because the MCS level currently used by the selected MS is not the lowest MCS level available in the wireless broadband Internet communication system, the uplink scheduler 130 can further decrease the MCS level. Therefore, the uplink scheduler 130 further decreases the MCS level to be allocated to the selected MS by one level, allowing the selected MS to support a lower data rate.

In step 227, the uplink scheduler 130 determines whether the highest possible CINR exceeds a CINR required when it allocates the intact MCS level allocated to the selected MS at the previous scheduling time. If it is determined that the highest possible CINR lower than the CINR required when it allocates the intact MCS level allocated to the selected MS at the previous scheduling time, the uplink scheduler 130 proceeds to step 229.

In step 229, the uplink scheduler 130 allocates an MCS level lower by a set level, for example, one level than the MCS level allocated to the selected MS at the previous scheduling time, and adjusts the number of slots to be allocated to the selected MS taking into account the headroom reported by the selected MS and the allocated MCS level, and then ends the operation. The uplink scheduler 130, as described in step 215, determines the number of slots to be allocated to the selected MS using Equation (1), and if the number of slots calculated in accordance with Equation (1) exceeds the required number of slots calculated taking into account the required amount of the bandwidth required by the selected MS, the uplink scheduler 130 finally determines the required number of slots calculated taking into account the required amount of the bandwidth required by the selected MS as the number of slots to be allocated to the selected MS. In addition, even if the number of slots calculated in accordance with Equation (1) exceeds the maximum number of slots that one MS can use, which is restricted for each individual MCS level in the wireless broadband Internet communication system, the uplink scheduler 130 finally determines the maximum number of slots that one MS can use, which is restricted for each individual MCS level, as the number of slots to be allocated to the selected MS, and then ends the operation.

However, if it is determined in step 227 that the highest possible CINR exceeds the CINR required when it allocates the intact MCS level allocated to the selected MS at the previous scheduling time, the uplink scheduler 130 proceeds to step 231.

In step 231, the uplink scheduler 130 maintains the MCS level allocated to the selected MS at the previous scheduling time, and determines, as described in step 215, the number of slots to be allocated to the selected MS using Equation (1). If the number of slots calculated using Equation (i) exceeds the required number of slots calculated taking into account the required account the bandwidth required by the selected MS, the uplink scheduler 130 finally determines the required number of slots calculated taking into account the required amount of the bandwidth required by the selected MS as the number of slots to be allocated to the selected MS. In addition, even if the number of slots calculated in accordance with Equation (1) exceeds the maximum number of slots that one MS can use, which is restricted for each individual MCS level in the wireless broadband Internet communication system, the uplink scheduler 130 finally determines the maximum number of slots that one MS can use, which is restricted for each individual MCS level, as the number of slots to be allocated to the selected MS, and then ends the operation.

If the channel state between the selected MS and the BS continuously deteriorates, the number of slots allocated to the selected MS may continuously decrease, with the MCS level for the selected MS remaining unchanged. As a result, a diversity gain decreases, causing a reduction in burst reception success rate. Therefore, in order to prevent this problem, the wireless broadband Internet communication system restricts the number of slots that can be reduced, for each individual MCS level. That is, if the number of allocated slots reduced in step 231 is less than the minimum number of slots that can be reduced for each individual MCS level, the uplink scheduler 130 decreases the MCS level by one level. In this case also, the uplink scheduler 130 should adjust the number of slots taking into account a difference between the previously allocated MCS level and the decreased MCS level.

The operation of FIGS. 2A and 2B can determine a transmission format for the selected MS with a less number of multiplications and divisions, making it possible to achieve uplink scheduling through less calculations. In addition, the operation restricts the number of slots allocable to one MS for each individual MCS level, thereby preventing the unnecessary waste of wireless resources and obtaining appropriate frequency diversity and time diversity.

Meanwhile, the transmission format decision operation of the uplink scheduler 130, described in connection with FIGS. 2A and 2B, represents an operation of determining a transmission format when a particular connection of the MS selected for uplink scheduling transmits a burst. However, in the uplink of the wireless broadband Internet communication system, because transmission power of an MS can be shared by a plurality of connections, a plurality of connections can be simultaneously set up for the same MS. In this case, the plurality of connections should be taken into consideration even for the transmission format decision.

Figure 3:
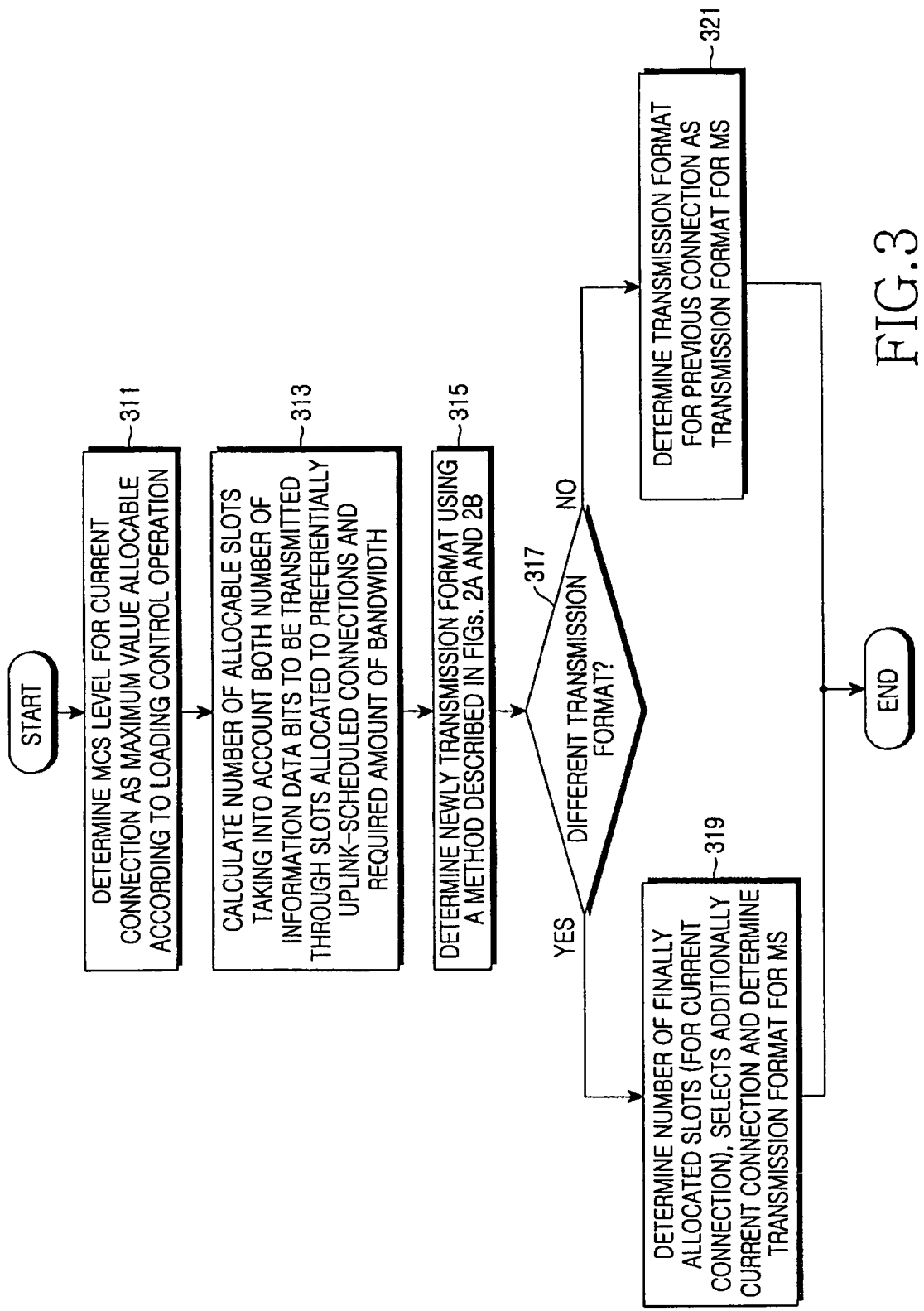
FIG. 3 is a flowchart illustrating an operation in which the uplink scheduler of FIG. 1 determines a transmission format when a plurality of connections are set up for the selected MS.

FIG. 3 is a flowchart illustrating an operation in which the uplink scheduler 130 of FIG. 1 determines a transmission format when a plurality of connections are set up for the selected MS.

Before a description of FIG. 3 is given, a brief description will be made of a transmission format decision operation of the uplink scheduler when a plurality of connections are set up for the selected MS.

In the case where a plurality of connections are set up for the same MS, in the process of performing uplink scheduling on each of the connections, it is necessary to determine a transmission format for a corresponding connection taking into account the uplink scheduling result on the previous connection. In this case, a sub-burst transmission is performed according to the uplink scheduling result on each of the connections, rather than other sub-burst transmission is performed by the MS in the same MS. Herein, the other sub-burst is generated according to the uplink scheduling result on the connections. That is, when a plurality of connections are set up for the same MS, a burst is generated according to the uplink scheduling result on the connections, and as a result, the burst is transmitted. Herein, the burst is generated in an MS. Therefore, the MCS level and the number of allocation slots are determined based on the burst.

Referring to FIG. 3, in step 311, an uplink scheduler 130 determines an MCS level for the connection on which it currently performs uplink scheduling as a maximum allocable value according to a loading control operation. In FIG. 3, for convenience, the connection on which it currently performs uplink scheduling is written as "current connection." The MCS level decision operation in step 311 is equal to the operation described in FIGS. 2A and 2B, so a detailed description thereof will be omitted. In step 313, the uplink scheduler 130 calculates the number of allocable slots taking into account both the number of information data bits to be transmitted through the slots allocated to the connections first uplink-scheduled for the same MS before the connection on which it currently performs uplink scheduling, and the required amount of a bandwidth of the connection on which it currently performs uplink scheduling. Herein, the number of information data bits to be transmitted through the slots allocated to the first uplink-scheduled connections includes all MAC overhead for each connection.

A description will now be made of the MAC overhead. First, when a plurality of connections is set up in the same MS, the uplink scheduler 130 determines the number of slots according to a total number of the number of information data bits to be transmitted for a selected connection at the previous scheduling time and the number of required amount of a bandwidth to be transmitted of a selected connection at the current scheduling time. That is, since the number of information data bits to be transmitted as a scheduling result and a header are transmitted, the number of information data bits to be transmitted through the slots allocated to the connections at the previous scheduling time includes MAC overhead of each of the connections.

In step 315, the uplink scheduler 130 determines newly a transmission format taking into account an amount of a bandwidth required, using the method described in FIGS. 2A and 2B. In step 317, the uplink scheduler 130 determines whether the transmission format determined in step 315 is different from the previous transmission format determined for all of the previous connections of the same MS. If it is determined that the determined transmission format is different from the transmission format determined for all of the previous connections of the same MS, the uplink scheduler 130 proceeds to step 319. In step 319, only when the determined number of allocation slots is less than the number of remaining slots, i.e. the number of allocable slots, the uplink scheduler 130 determines the determined number of allocation slots as the number of slots to be finally allocated, selects additionally the current connection, and determines the determined transmission format as a transmission format for the MS, and then ends the operation.

If it is determined in step 317 that the determined transmission format is equal to the transmission format determined for all of the previous connections of the same MS, the uplink scheduler 130 proceeds to step 321. In step 321, only when the determined number of allocation slots exceeds the number of remaining slots, the uplink scheduler 130 determines the transmission format for all of the previous connections of the same MS as a transmission format for the MS, considering that it has failed in uplink scheduling on the connection on which it currently performs uplink scheduling.

Even after the uplink scheduler 130 determines transmission formats for all connections set up for the selected MS, there may be some remaining allocable slots, causing a possible decrease in slot utilization. This is because in determining a transmission format for the corresponding connection, the uplink scheduler 130 restricts the maximum number of allocable slots for each individual MCS level during slot allocation. Therefore, there is a need for a method capable of increasing the slot utilization, and this can be realized by allocating more slots to the MS, the number of allocation slots of which is restricted to the maximum number of slots for each individual MCS level in FIGS. 2A and 2B.

FIG. 4 is a flowchart illustrating an operation in which the uplink scheduler 130 of FIG. 1 increases slot utilization.

Referring to FIG. 4, in step 411, in case that the uplink scheduler 130 determines a transmission format, when the uplink scheduler 130 calculates the number of slots to be allocated, using the transmission power level reported by the selected MS, the uplink scheduler 130 separately stores a value (number of slots), based on which the maximum number of allocable slots for each individual MCS level is not restricted. In step 413, the uplink scheduler 130 determines transmission formats for all the connections set up for the selected MS as described in FIGS. 2A and 2B. In step 415, after determining the transmission formats for all the connections, the uplink scheduler 130 determines whether the number of remaining slots is less than the threshold number of slots.

If it is determined that the number of remaining slots is less than the threshold number of slots, the uplink scheduler 130 changes, in step 417, a threshold for each individual MCS level, used for determining transmission formats for all the connections set up for the selected MS, to the maximum number of slots allocable.

In step 419, the uplink scheduler 130 re-performs the transmission format decision operation on all the connections set up for the selected MS using the maximum number of slots allocable, and then ends the operation.

However, if it is determined in step 415 that the number of remaining slots is not lower than the threshold number of slots, indicating that transmission format decision for all the connections set up for the selected MS is completed, the uplink scheduler 130 completes the uplink scheduling in step 421, and then ends the operation.

As can be understood from the foregoing description, the present invention provides an uplink scheduling scheme in the wireless broadband Internet communication system, thereby enabling efficient uplink data transmission. In particular, the present invention allows all BSs to have an appropriate load level through loading control, thereby guaranteeing the coverage satisfying a reference data rate. In addition, the uplink scheduling scheme detects a variation in channel state between each MS and a BS, thereby maximizing efficiency of wireless resources while guaranteeing fairness, and obtaining the optimal scheduling result within a predetermined time limit.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An uplink scheduling method in a wireless broadband internet communication system, the method comprising the steps of:
    calculating priorities of mobile stations (MSs) taking into account headroom size indicating transmission power additionally available for each of the MSs; and
    determining a transmission format of an MS selected to be preferentially allocated a slot as a result of the priority calculation, taking into account the headroom size reported by the selected MS and a margin determined based on a variation in a channel state between the selected MS and a base station (BS),
    wherein determining the transmission format of the selected MS comprises determining a data rate of the selected MS such that the data rate exceeds a data rate at a previous scheduling time, if the headroom size of the selected MS exceeds the margin.

2. The uplink scheduling method of claim 1, wherein the step of determining a transmission format of a selected MS comprises:
    if the headroom size of the selected MS exceeds the margin, determining whether a Modulation and Coding Scheme (MCS) level allocated to the selected MS at a previous scheduling time is a highest MCS level available in the wireless broadband internet communication system; and
    if the MCS level allocated to the selected MS at the previous scheduling time is the highest MCS level, maintaining an MCS level of the selected MS at the MCS level allocated to the selected MS at the previous scheduling time, and allocating to the selected MS a number of slots which is greater than the number of slots allocated to the selected MS at the previous scheduling time.

3. The uplink scheduling method of claim 2, further comprising:

if the MCS level allocated to the selected MS at the previous scheduling time is not the highest MCS level, determining whether a maximum possible size of a received burst that the selected MS can acquire at the previous scheduling time exceeds a size of a received burst required when allocating an MCS level increased by a predetermined level greater than the MCS level allocated to the selected MS at the previous scheduling time;

if the maximum possible size of the received burst exceeds the size of the received burst required when allocating the MCS level by the predetermined level greater than the MCS level allocated to the selected MS at the previous scheduling time, allocating the MCS level of the selected MS as an MCS level increased by the predetermined level greater than the MCS level allocated to the selected MS at the previous scheduling time; and adjusting the number of slots to be allocated to the selected MS taking into account the headroom size reported by the selected MS and the allocated MCS level;

wherein the maximum possible size of the received burst is calculated using an estimated size of the received burst for the selected MS and the headroom size information.

4. The uplink scheduling method of claim 3, further comprising:

if the maximum possible size of the received burst is less than the size of the received burst required when allocating the MCS level increased by the predetermined level greater than the MCS level allocated to the selected MS at the previous scheduling time, maintaining an MCS level of the selected MS at the MCS level allocated to the selected MS at the previous scheduling time; and adjusting the number of slots to be allocated to the selected MS taking into account the headroom size reported by the selected MS and the allocated MCS level.

5. The uplink scheduling method of claim 1, wherein the step of determining a transmission format of a selected MS comprises:

if the headroom size of the selected MS is less than the margin, determining whether an MCS level allocated to the selected MS at a previous scheduling time is a lowest MCS level available in the wireless broadband interne communication system; and if the MCS level allocated to the selected MS at the previous scheduling time is the lowest MCS level, maintaining an MCS level of the selected MS at the MCS level allocated to the selected MS at the previous scheduling time, and allocating to the selected MS a number of slots which is less than the number of slots allocated to the selected MS at the previous scheduling time.

6. The uplink scheduling method of claim 5, further comprising:

if the MCS level allocated to the selected MS at the previous scheduling time is not the lowest MCS level, determining whether a maximum possible size of a received burst that the selected MS can acquire exceeds a size of a received burst required when maintaining an MCS level allocated to the selected MS at the previous scheduling time;

if the maximum possible size of the received burst is less than the size of the received burst required when maintaining the MCS level allocated to the selected MS at the previous scheduling time, allocating the MCS level of the selected MS as an MCS level decreased by the predetermined level less than the MCS level allocated to the selected MS at the previous scheduling time; and adjusting the number of slots to be allocated to the selected MS taking into account the headroom size reported by the selected MS and the allocated MCS level;

wherein the maximum possible size of the received burst is calculated using an estimated size of the received burst for the selected MS and the headroom size information at the previous scheduling time.

7. The uplink scheduling method of claim 6, further comprising:

if the maximum possible size of the received burst exceeds the size of the received burst required when maintaining the MCS level allocated to the selected MS at the previous scheduling time, maintaining an MCS level of the selected MS at the MCS level allocated to the selected MS at the previous scheduling time; and adjusting the number of slots to be allocated to the selected MS taking into account the headroom size reported by the selected MS and the allocated MCS level.

8. The uplink scheduling method of claim 1, wherein the step of determining a transmission format of a selected MS comprises determining a transmission format for a current connection taking into account a transmission format determined for a previous connection, if a plurality of connections are set up to the selected MS.

9. An uplink scheduling system in a wireless broadband interne communication system, the system comprising:

an uplink scheduler for calculating priorities of mobile stations (MSs) taking into account headroom size indicating transmission power additionally available for each of the MSs, and determining a transmission format of an MS selected to be preferentially allocated a slot as a result of the priority calculation, taking into account the headroom size reported by the selected MS and a margin determined based on a variation in a channel state between the selected MS and a base station (BS), wherein the uplink scheduler determines a data rate of the selected MS such that the data rate exceeds a data rate at a previous scheduling time, if the headroom size of the selected MS exceeds the margin.

10. The uplink scheduling system of claim 9, wherein if the headroom size of the selected MS exceeds the margin, the uplink scheduler determines whether a Modulation and Coding Scheme (MCS) level allocated to the selected MS at a previous scheduling time is a highest MCS level available in the wireless broadband internet communication system, and if the MCS level allocated to the selected MS at the previous scheduling time is the highest MCS level, the uplink scheduler maintains an MCS level of the selected MS at the MCS level allocated to the selected MS at the previous scheduling time, and allocates to the selected MS a number of slots which is greater than the number of slots allocated to the selected MS at the previous scheduling time.

11. The uplink scheduling system of claim 10, wherein if the MCS level allocated to the selected MS at the previous scheduling time is not the highest MCS level, the uplink scheduler determines whether a maximum possible size of a received burst that the selected MS can acquire at the previous scheduling time exceeds a size of a received burst required when allocating an MCS level greater by a predetermined level than the MCS level allocated to the selected MS at the previous scheduling time, if the maximum possible size of the received burst exceeds the size of the received burst required when allocating the MCS level increased by the predetermined level greater than the MCS level allocated to the selected MS at the previous scheduling time, the uplink scheduler allocates the MCS level of the selected MS as an MCS level increased by the predetermined level greater than the MCS level allocated to the selected MS at the previous scheduling time, the uplink scheduler adjusts the number of slots to be allocated to the selected MS taking into account the headroom size reported by the selected MS and the allocated MCS level, and wherein the maximum possible size of the received burst is calculated by the uplink scheduler using an estimated size of the received burst for the selected MS and the headroom size information.

12. The uplink scheduling system of claim 11, wherein if the maximum possible size of the received burst is less than the size of the received burst required when allocating the MCS level increased by the predetermined level greater than the MCS level allocated to the selected MS at the previous scheduling time, the uplink scheduler maintains an MCS level of the selected MS at the MCS level allocated to the selected MS at the previous scheduling time, and the uplink scheduler adjusts the number of slots to be allocated to the selected MS taking into account the headroom size reported by the selected MS and the allocated MCS level.

13. The uplink scheduling system of claim 9, wherein if the headroom size of the selected MS is lower than the margin, the uplink scheduler determines whether an MCS level allocated to the selected MS at a previous scheduling time is a lowest MCS level available in the wireless broadband internet communication system, and if the MCS level allocated to the selected MS at the previous scheduling time is the lowest MCS level, the uplink scheduler maintains an MCS level of the selected MS at the MCS level allocated to the selected MS at the previous scheduling time, and the uplink scheduler allocates to the selected MS a number of slots which is less than the number of slots allocated to the selected MS at the previous scheduling time.

14. The uplink scheduling system of claim 13, wherein if the MCS level allocated to the selected MS at the previous scheduling time is not the lowest MCS level, the uplink scheduler determines whether a maximum possible size of a received burst that the selected MS can acquire exceeds a size of a received burst required when maintaining an MCS level allocated to the selected MS at the previous scheduling time, if the maximum possible size of the received burst is lower than the size of the received burst required when maintaining the MCS level allocated to the selected MS at the previous scheduling time, the uplink scheduler allocates the MCS level of the selected MS as an MCS level decreased by the predetermined level less than the MCS level allocated to the selected MS at the previous scheduling time, the uplink scheduler adjusts the number of slots to be allocated to the selected MS taking into account the headroom size reported by the selected MS and the allocated MCS level, and wherein the maximum possible size of the received burst is calculated by the uplink scheduler using an estimated size of the received burst for the selected MS and the headroom size information at the previous scheduling time.

15. The uplink scheduling system of claim 14, wherein if the maximum possible size of the received burst exceeds the size of the received burst required when maintaining the MCS level allocated to the selected MS at the previous scheduling time, the uplink scheduler maintains an MCS level of the selected MS at the MCS level allocated to the selected MS at the previous scheduling time, and the uplink scheduler adjusts the number of slots to be allocated to the selected MS taking into account the headroom size reported by the selected MS and the allocated MCS level.

16. The uplink scheduling system of claim 9, wherein the uplink scheduler determines a transmission format for a current connection taking into account a transmission format determined for a previous connection, if a plurality of connections are set up to the selected MS.

17. The uplink scheduling system of claim 9, further comprising:

a low medium access control (L-MAC) module for detecting the headroom size reported from each of the MSs; and a modem for transmitting the determined transmission format of the MS to the selected MS.

* * * * *